United States Patent
van Walderveen et al.

(10) Patent No.: US 6,402,456 B1
(45) Date of Patent: Jun. 11, 2002

(54) LIFTING DEVICE FOR LIFTING AND/OR LOWERING AN ORDERED STACK OF ARTICLES

(75) Inventors: Bart van Walderveen, Westbroek; Martin Doornekamp, Nijkerk, both of (NL)

(73) Assignee: FPS Food Processing Systems, B.V. (NL)

( * ) Notice: Subject to any disclaimer, the term of this patent is extended or adjusted under 35 U.S.C. 154(b) by 0 days.

(21) Appl. No.: 09/508,729

(22) PCT Filed: Sep. 14, 1998

(86) PCT No.: PCT/NL98/00529

§ 371 (c)(1),
(2), (4) Date: May 25, 2000

(87) PCT Pub. No.: WO99/14138

PCT Pub. Date: Mar. 25, 1999

(30) Foreign Application Priority Data

Sep. 15, 1997 (NL) ............................................. 1007037

(51) Int. Cl.$^7$ ................................................ D06F 9/00
(52) U.S. Cl. .................... 414/796; 414/795; 414/794.9; 414/795.3; 414/67
(58) Field of Search ........................... 414/794.9, 796.7, 414/795, 795.3, 67, 96, 906, 120, 796

(56) References Cited

U.S. PATENT DOCUMENTS

| | | | | |
|---|---|---|---|---|
| 2,895,624 A | * | 7/1959 | Oster | ............................. 214/6 |
| 3,171,550 A | * | 3/1965 | Gajdostik et al. | ............... 214/6 |
| 3,509,995 A | * | 5/1970 | Colaw | ......................... 414/795 |
| 3,685,671 A | * | 8/1972 | Layman | .................... 214/6 BA |
| 4,047,622 A | * | 9/1977 | Blessing | .................. 214/8.5 A |
| 4,143,758 A | * | 3/1979 | Gram | .......................... 198/624 |
| 4,302,142 A | * | 11/1981 | Kuhl et al. | .................. 414/120 |
| 4,765,487 A | * | 8/1988 | Bliss | ........................... 209/510 |
| 5,088,883 A | * | 2/1992 | Fock et al. | .................. 414/795 |
| 5,823,738 A | * | 10/1998 | Spatafora et al. | ......... 414/795.1 |
| 5,832,693 A | * | 11/1998 | Yuyama et al. | ................ 53/168 |
| 5,882,174 A | * | 3/1999 | Woerner et al. | .......... 414/788.7 |
| 6,135,705 A | * | 10/2000 | Katoch | ........................ 414/795 |

* cited by examiner

Primary Examiner—Joseph A. Fischetti
(74) Attorney, Agent, or Firm—Larson & Taylor, PLC

(57) ABSTRACT

A lifting method and device. A first lifting device lifts a multi-layer stack of articles from a lower position upwardly to a raised position at which the uppermost layer is at a desired level for removal of articles. The first lifting device continues to move the stack upwardly in increments for subsequent removal of articles in subsequent layers at the desired level. A second lifting device engages the bottom of the stack at locations different from the areas engaged by the first lifting device for continuing upward movement of the stack for positioning the remaining layers at the desired level for the removal of articles therefrom. The first lifting device is then movable downwardly to receive a new stack and the second lifting means is foldable to a retracted position and movable to a position below the new stack.

13 Claims, 5 Drawing Sheets

LIFTING DEVICE FOR LIFTING AND/OR LOWERING AN ORDERED STACK OF ARTICLES

FIELD OF THE INVENTION

The invention relates to a lifting device for lifting an ordered stack of articles, which lifting device is intended for cooperating with an unstacking device and with a stack-feeding conveyor.

The device is particularly intended for an unstacking device in which the articles to be fed are discharged from above. The stacks that are unstacked in the lifting device, are moved to the lifting device by a stack-feeding conveyor

BACKGROUND OF THE INVENTION

A problem involved in known lifting devices intended for cooperating with an unstacking device is that the unstacking process is interrupted when a complete stach has been unstacked in the lifting device and a new stack is to be fed into the lifting device. In the known devices, during the feed of a complete stack to the lifting device, it is not possible to continue the unstacking process. As a consequence, in the known lifting devices, the discharge of the articles removed from a stack cannot take place in a continuous manner. Such discontinuous discharge of articles is generally undesired.

SUMMARY OF THE INVENTION

The object of the invention is to provide a lifting device without the above-mentioned drawbacks.

To this end, the lifting device is characterized by the features of claim 1.

Due to the particular cooperation of the first lifting means and the second lifting means, the uppermost article of a stack located in the lifting device can, when the lifting device cooperates with an unstacking device, in each case be removed from the same place in a continuous manner. In this context, 'continuous' must at least be understood to mean 'at a fixed rhythm'. As soon as an article has been removed from the stack, the lifting means will move the stack located in the lifting device slightly upwards, causing a next uppermost article to be located at the fixed, desired level, whence that next article can then be removed again by the unstacking device.

As the lifting device possesses first lifting means and second lifting means, a completely formed stack and a partially formed stack can simultaneously be located in the device. As a result, when the lifting device cooperates with an unstacking device, a second complete stack can be fed to the lifting device and received by the first lifting means, while the second lifting means support an already partially unstacked first stack, so that an uppermost article of this first stack is always kept at the desired fixed level. As soon as the first stack has been unstacked completely, the uppermost article of the second stack is moved to the desired fixed level, so that the unstacking procedure can be continued without interruption. In the meantime, the second lifting means can, after a passage of time, take over the second stack from the first lifting means, after which the first lifting means are moved into a position in which they are ready to receive a third stack.

Summarizing, it can be stated that the presence of the first lifting means and the second lifting means enables a continuous unstacking process, which unstacking process need not be interrupted for feeding or discharging a complete stack of articles. The lifting device according to the invention can be realized in a relatively simple manner and can hence be manufactured in an economical manner. As the lifting frames can be brought from a folded-down position into a folded-up position, the lifting frames can pass an entirely or partially formed stack in vertical direction, which is important for causing the unstacking process to take place in a continuous manner.

In should be noted that from U.S. Pat. No. 2,205,767 a stacking device is known which comprises first and second lifting means. The second lifting means do engage the lower side of the lowermost article of the stack in the same area as the second lifting means. Consequently, the first and second lifting means cannot pass each other. Further, the articles which are supported by the second lifting means have to be removed from the second lifting means by retracting the second lifting means and thereby shifting the stack over the second lifting means.

From U.S. Pat. No. 2,895,624 a stacking device is known for forming a stack of article on a bunk. The known device has first and second lifting elements which engage the lower side of the bunk. The movement and the relative position of the first and second lifting means is coupled by a chain. Consequently, the first lifting means cannot take over a stack from the second lifting means. As a consequence, the supply of articles to the board on which the articles have to be stacked must be interrupted for some time to position an empty bunk while removing a bunk containing a full stack. In view thereof the supply of articles to be stacked cannot be and is not continuous.

Further elaborations of the invention are described in the subclaims and will be specified on the basis of an exemplary embodiment, with reference to the accompanying drawings.

DETAILED DESCRIPTION OF THE PREFERRED EMBODIMENTS

Figure 1:
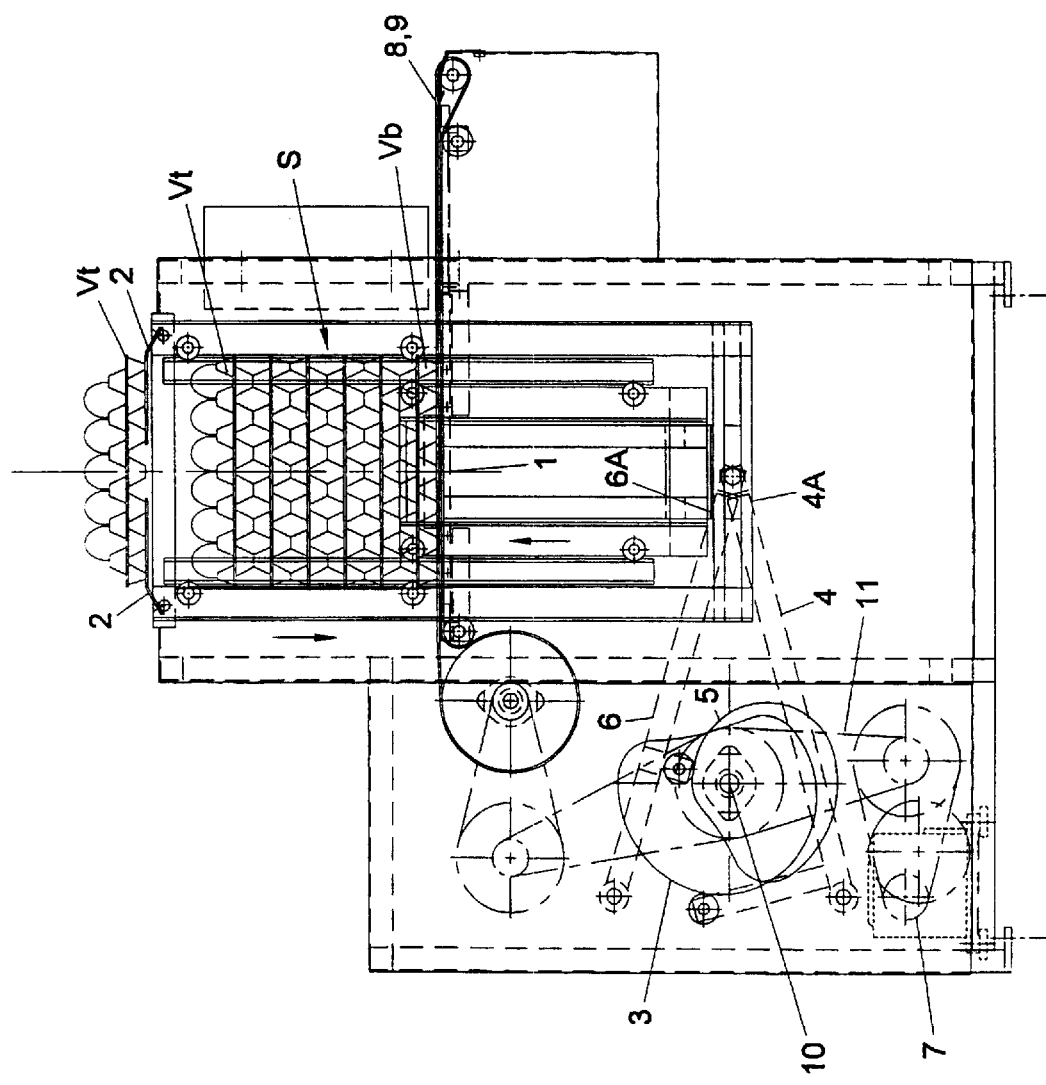
FIG. 1 is a front view of an exemplary embodiment of the device in a first condition.

The lifting device shown in FIGS. 1–5 is intended for lifting an ordered stack S of articles V. In the present case, this concerns trays filled with eggs. However, it may also concern boxes of eggs or other articles to be stacked having a substantially rectangular section. The lifting device is in particular intended for cooperating with an unstacking device and with a stack-feeding conveyor.

The lifting device comprises first lifting means constructed as a vertically adjustable lifting table 1 and second lifting means constructed as lifting frames 2. These lifting frames can likewise be adjusted upwards and downwards and can moreover assume a folded-down and folded-up position. The lifting table 1 engages a first area of the lower side of a lowermost article Vb of a stack S. In a folded-down position, the lifting frames 2 engage a second area of the lower side of the lowermost article Vb of the stack S, while the first area and the second area do not coincide. In the folded-up position, the lifting frames 2 can pass a stack S in vertical direction. As FIG. 4 clearly demonstrates, the lifting table 1 and the lifting frames 2 are of a construction such that the first area is formed by a central part of the lower side of the lowermost article Vb, while the second area is formed by a part of the lower side of the lowermost article Vb which part surrounds the central part.

The lifting device according to the present exemplary embodiment comprises first drive means 3, 4 intended for adjusting the height of the lifting table 1 and second drive means 5, 6 intended for adjusting the height of the lifting frames 2.

The first lifting means comprise a drive cam 3 controlling the position of the lever 4. The cam 3 is driven by a drive motor 7. The lever 4 has one end 4a thereof pivotally and/or slidably connected to a part which is fixedly connected to the lifting table 1. Rotation of the cam 3 causes a pivotal movement of the lever 4, which pivotal movement in turn results in a height adjustment of the table 1. The second drive means 5, 6 likewise comprise a cam 5 determining the position of a pivotally bearing-mounted lever 6. The lever 6 has one end 6a thereof pivotally and/or slidably connected to a part which is fixedly connected to the lifting frames 2. The position of the lever 6 and, accordingly, the vertical position of the lifting frames 2 is determined by the rotative position of the cam 5, which rotative position is in turn determined by the drive motor 7. The two cams 3, 5 are mounted so as to be restrained from rotation on a common shaft 10 driven by a chain or belt 11, which is in turn driven by the motor 7. To provide that a complete stack S is completely supported when it is being slid into or out of the lifting device, a supporting element 8, 9 is preferably located on either side of the lifting table 1, at the level of the lowermost position of this lifting table 1. In the present exemplary embodiment, these supporting elements 8, 9 are designed as endless conveyors 8, 9 whose feed ends 8a, 9a are intended to connect to a stack-feeding and stack-discharging device respectively, such as for instance a conveyor belt. In the present exemplary embodiment, the drive of these endless conveyors 8, 9 is also connected to the drive motor 7, via chain wheels or pulleys and chains or belts cooperating therewith. It is thus effected that all movements of the lifting table 1, the lifting frames 2 and the endless conveyors 8, 9 are intercoupled. It is observed that instead of the endless conveyor belts 8, 9 as supporting elements, plate parts may also be used, extending on either side of the lifting table 1 so as to provide, with the lifting table 1, a supporting surface which fully supports the entire stack.

Figure 2:
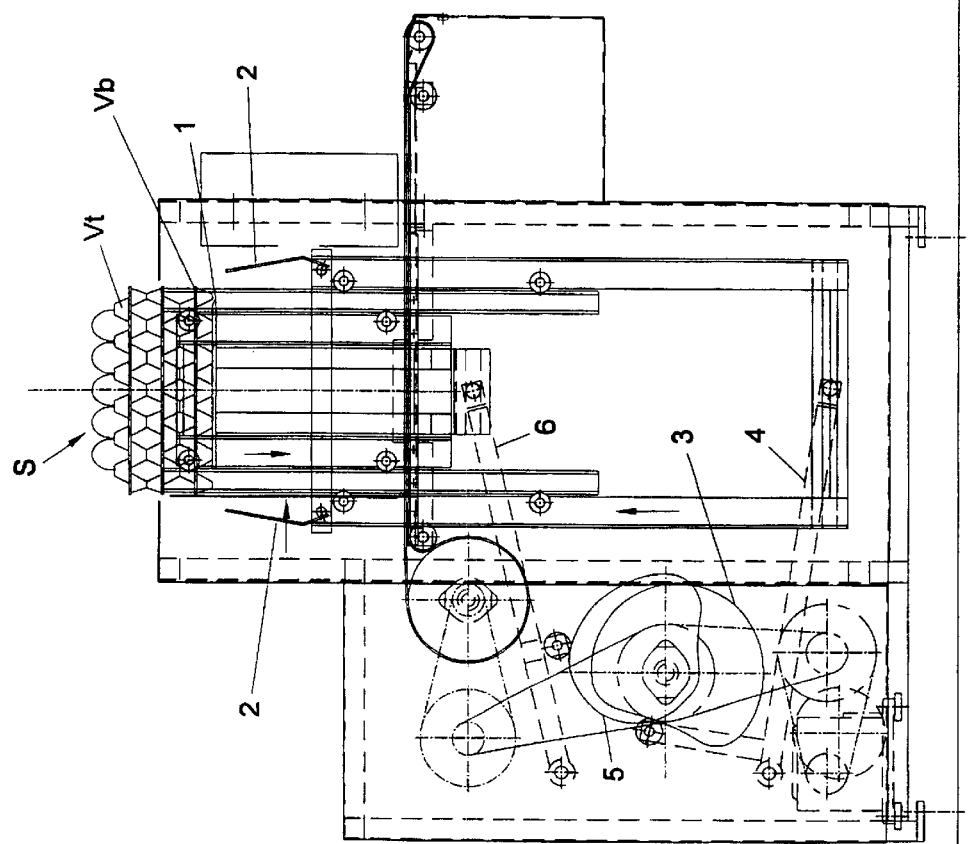
FIG. 2 is a front view similar to FIG. 1, in a second condition.
Figure 3:
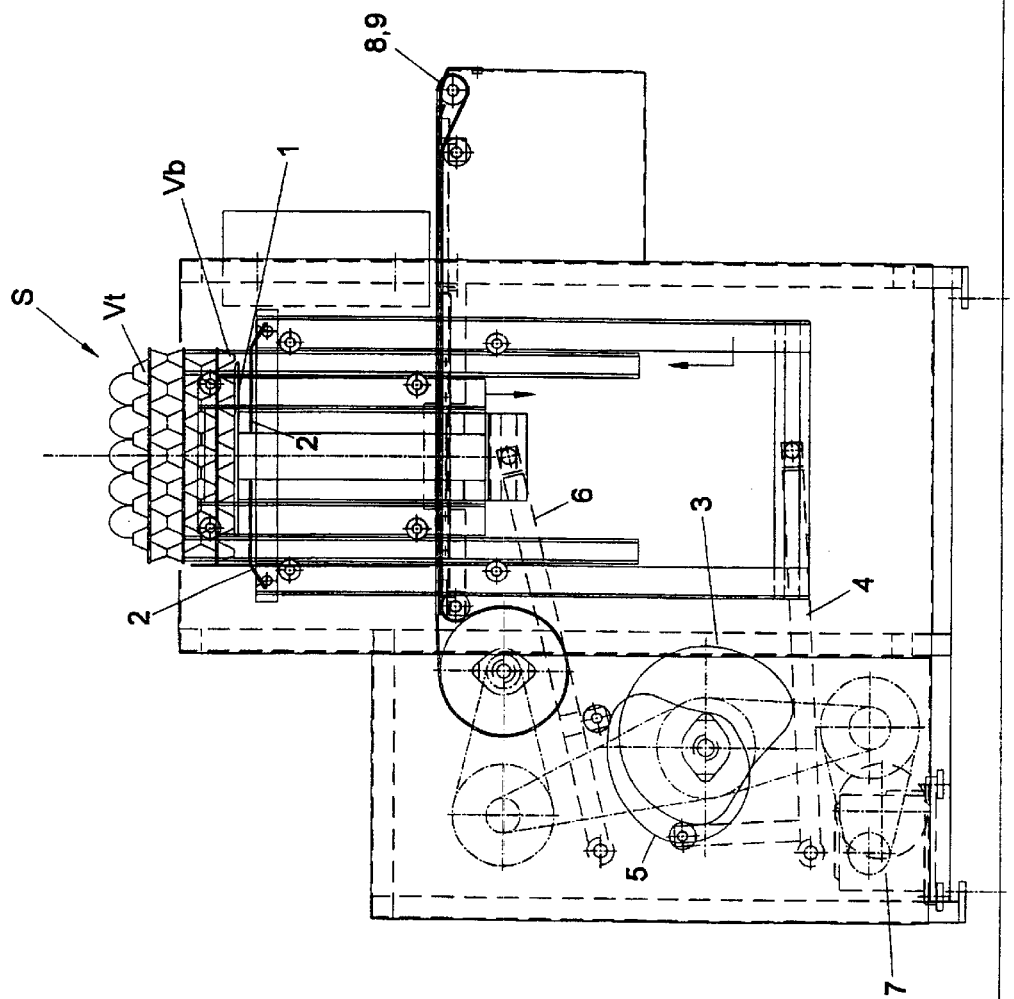
FIG. 3 is a front view similar to FIGS. 1 and 2, in a third condition.
Figure 4:
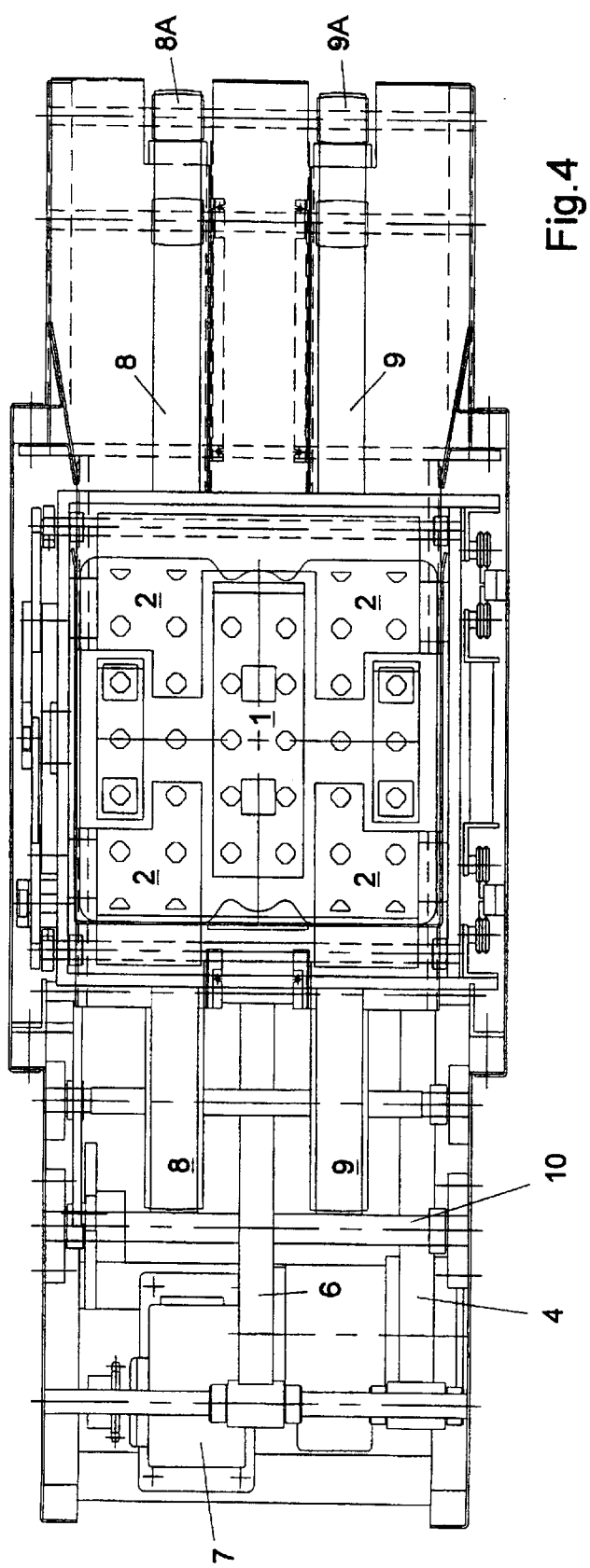
FIG. 4 is a top plan view of the device shown in FIGS. 1–3.
Figure 5:
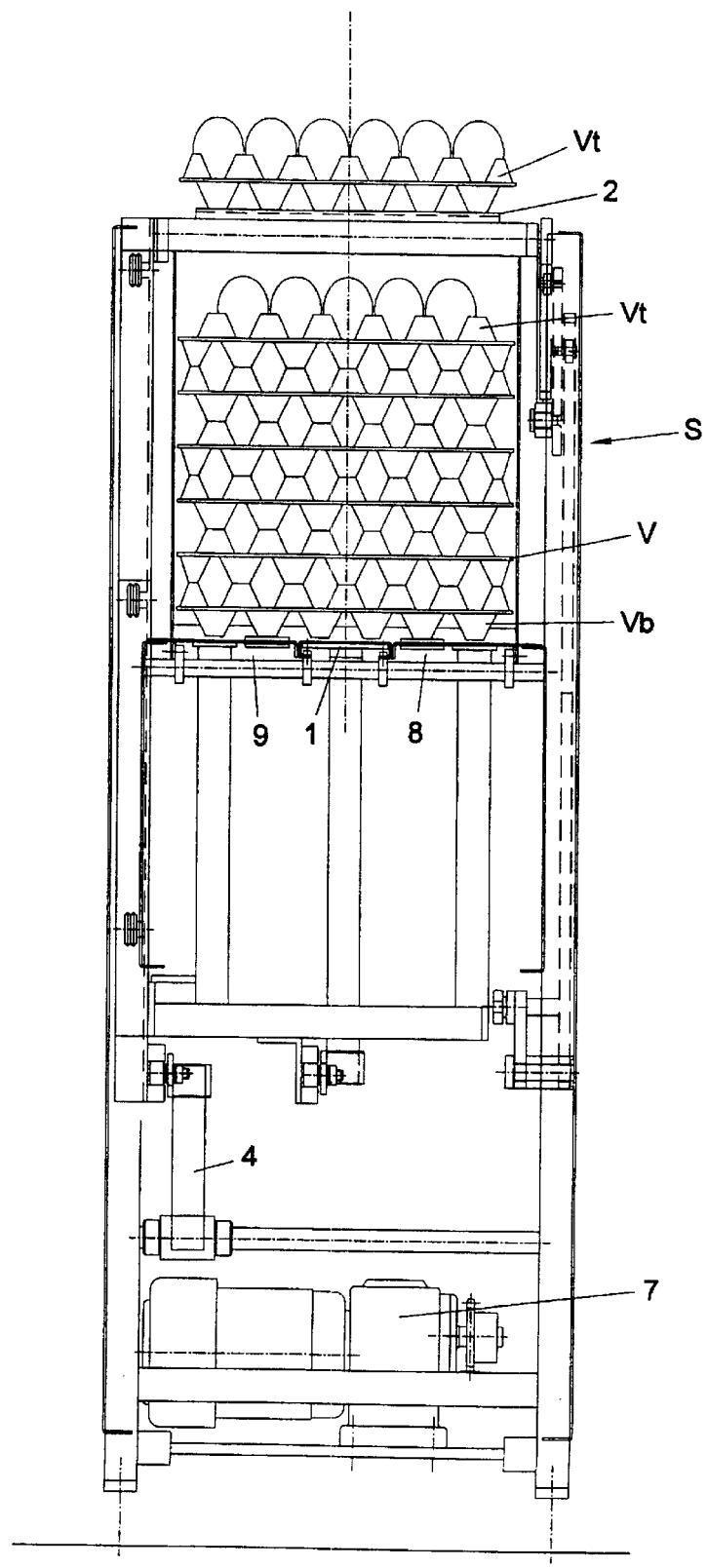
FIG. 5 is a left-side view of the lifting device shown in FIGS. 1–3.

When intended for cooperating with the unstacking device, the operation of the lifting device is as follows:

When a first stack of articles is being fed into the lifting device, the lifting table 1 is in a lowermost position. If necessary, the lifting frames 2 can support the last article or the last few articles of a preceding stack and the lifting frames are virtually in the uppermost position. This position is shown in FIG. 1, in which the lifting table 1 is in the lowermost position and the lifting frames 2 are in an uppermost position, in folded-down condition. When the last article Vt of the preceding stack has been removed from the lifting frames 2, the lifting frames 2 are folded up and the lifting table 1 is moved upwards stepwise, so that in each case the uppermost article Vt can be removed from the stack S and it is provided that the uppermost article Vt of the stack S is always at the same fixed level. The meanwhile folded-up lifting frames 2 are moved to a level below the lifting table 1. This condition is shown in FIG. 2. Next, the lifting frames 2 can be folded down and moved up again for taking over the support of the stack S. This condition is shown in FIG. 3. In FIG. 3, the stack S is still supported by the lifting table 1, but the lifting frames 2 are about to take over the support of the stack S. Next, the lifting table 1 is moved down to the lowermost position, to be ready for receiving a next stack of articles, while the lifting frames 2 move up stepwise. The stepped upward movement of the lifting frames 2, too, takes place such that the uppermost article Vt of the stack S is always at the same fixed level at the right moment for the desired duration. In this condition, the lifting device is ready to repeat the above-described procedure for a next stack.

It is readily understood that the invention is not limited to the exemplary embodiment described, but that various modifications are possible within the framework of the invention. For instance, the drive may also take place by means of two motors which, via a gear wheel and a gear rack, engage movable frame parts mounting the lifting frames 2 and the lifting table 1. Also, the lifting frames 2 and the lifting table 1 may have a different shape and the manner of feeding and discharging a stack S to and from the lifting device may be varied. One may for instance think of a pusher plate pushing a stack from or into the lifting device. It is essential that the lifting device be provided with first and second lifting means, causing the uppermost article of an uppermost stack located in the lifting device to be always at the same level, so that the stacking and/or unstacking process can take place in a continuous manner.

We claim:

1. A lifting device for lifting an ordered stack of articles, said lifting device cooperating with an unstacking device and with a stack-feeding conveyor, the lifting device comprising:

first lifting means and second lifting means, said first lifting means and second lifting means cooperating such that the device continuously keeps an uppermost article of a stack located in the lifting device at a fixed, desired level, the first lifting means being constructed as a vertically adjustable lifting table, the lifting table engaging a first area of a lower side of a lowermost article of the stack, the second lifting means being constructed as lifting frames, the lifting frames in a folded-down position engaging a second area of the lower side of the lowermost article of the stack, while the first area and the second area do not coincide, and the lifting frames in a folded-up position being moveable from above a stack around the sides thereof to an operative position beneath a subsequent stack, the lifting table and the lifting frames being of a construction such that the first area is formed by a central part of the lower side of the lowermost article which part surrounds the central part, the lifting device comprising first drive means for adjusting height of the lifting table and second drive means for adjusting height of the lifting frames.

2. A lifting device according to claim 1 wherein the first and second drive means each comprise a cam and rod system, and a common motor driving the cam and rod system.

3. A lifting device according to claim 1 wherein a supporting element is located on either side of the lifting table, substantially level to a lowermost position of the lifting table, so that during feeding of a stack, into the lifting device, said stack is supported over substantially the entire lower side of the lowermost article thereof.

4. A lifting device according to claim 1 wherein the two supporting elements located on either side of the lifting table are designed as endless conveyors whose feed ends are connected to said stack-feeding and stack discharging device.

5. A lifting device according to claim 1 wherein said lifting device cooperates with the unstacking device, the drive of the lifting table and the lifting frames being such that when a first stack of articles is being fed into the lifting device, the lifting table is in a lowermost position, the lifting table being subsequently moveable upwards stepwise until a number of articles have been removed from the first stack, the lifting frames, then being subsequently foldable down and moveable upwardly for taking over the support of the stack of articles, after the lifting table is subsequently moved down to the lowermost position, to be ready to receive a second stack of articles, while the lifting frames move up stepwise, the stepped upward movement of the lifting table and the lifting frames taking place such that the uppermost article of the stack is always at the same fixed level.

6. A lifting device for lifting a multi-layered stack of ordered articles from a lower position to a raised position whereat the uppermost layer is at a desired level where it can be removed from the stack, a first lifting means for lifting the stack from said lower position upwardly to said raised position at which the uppermost layer can be removed from the stack and for moving the stack farther upwardly to permit at least some of the subsequent remaining uppermost layers to reach said desired level and be removed from the stack, a second lifting means for engaging the bottom of the stack at locations on the bottom of the stack different from locations where the first lifting means engages the bottom of the stack for further raising the stack to bring the remaining layers of the stack to the desired level where they can be removed from the stack, and said second lifting means being movable between a generally horizontal operative position at which it can engage and support the bottom of a stack and a retracted position wherein it can move from above a stack around the sides thereof to an operative position beneath a subsequent stack.

7. The lifting device of claim 6 wherein said first lifting means comprises a vertically adjustable lifting table.

8. The lifting device of claim 7 wherein said second lifting means comprise lifting frames which can be folded up and down.

9. The lifting device of claim 8 further comprising first drive means for adjusting height of the lifting table and second drive means for adjusting height of the lifting frames.

10. The lifting device of claim 9 wherein said first and second drive means comprise a cam and rod system.

11. The device of claims 10 including a common motor for said cam and rod system.

12. The lifting device of claim 6 further comprising supporting elements located on either side of the first lifting means in order to support substantially an entire bottom side of a lowermost layer of articles in the stack.

13. The lifting device of claim 12 wherein said supporting elements are endless conveyors having feed ends connectable to a stack-feeding and stack-discharging device.

* * * * *